(12) United States Patent
Ferrandon

(10) Patent No.: US 12,555,127 B1
(45) Date of Patent: Feb. 17, 2026

(54) GOODS AUTHENTICATION METHOD USING AN EMBEDDED GEMSTONE WITH BLOCKCHAIN TECHNOLOGY

(71) Applicant: Cecylia Ferrandon, Emerald Hill, CA (US)

(72) Inventor: Cecylia Ferrandon, Emerald Hill, CA (US)

(*) Notice: Subject to any disclaimer, the term of this patent is extended or adjusted under 35 U.S.C. 154(b) by 6 days.

(21) Appl. No.: 18/764,227

(22) Filed: Jul. 4, 2024

(51) Int. Cl.
*G06Q 30/018* (2023.01)

(52) U.S. Cl.
CPC .................. *G06Q 30/0185* (2013.01)

(58) Field of Classification Search
None
See application file for complete search history.

(56) References Cited

U.S. PATENT DOCUMENTS

| | | | | |
|---|---|---|---|---|
| 2021/0287288 A1* | 9/2021 | Madisetti | .................. | H04L 9/14 |
| 2022/0255733 A1* | 8/2022 | Hakim | ..................... | G09C 5/00 |
| 2023/0075767 A1* | 3/2023 | Bradley | ............. | G06Q 30/0234 |
| 2023/0344660 A1* | 10/2023 | Hakim | ..................... | A44C 17/00 |
| 2023/0384233 A1* | 11/2023 | Gonta | ..................... | G06V 10/82 |
| 2023/0384234 A1* | 11/2023 | Gonta | ....................... | G06N 3/08 |
| 2024/0104326 A1* | 3/2024 | Hakim | ................. | B28D 5/0058 |

FOREIGN PATENT DOCUMENTS

WO    WO-2020045192 A1 *  3/2020  ............. G06Q 20/06

* cited by examiner

*Primary Examiner* — Andrew B Whitaker
(74) *Attorney, Agent, or Firm* — Donald J. Ersler

(57) ABSTRACT

A goods authentication method using an embedded gemstone with blockchain technology preferably includes a setting, a gemstone, a gemstone with an embedded blockchain key and recording the blockchain key on a database. The setting is structured to retain the gemstone and is attached to the good or product with any suitable fastening structure or method. A portion of the gemstone containing the blockchain key is exposed in the setting. The gemstone is preferably a lab-grown diamond, but other precious gemstones could be used. Using a lab-grown diamond eliminates the need to cut a natural gemstone to fit in a gem cavity in the setting. Forming the blockchain key in the gemstone may be accomplished with laser etching or physical engraving operation. The blockchain key is recorded on a database, which would be accessible by an owner and a potential purchaser of the good.

17 Claims, 3 Drawing Sheets

GOODS AUTHENTICATION METHOD USING AN EMBEDDED GEMSTONE WITH BLOCKCHAIN TECHNOLOGY

BACKGROUND OF THE INVENTION

1. Field of the Invention

The present invention relates generally to authentication of a good or product and more specifically to a goods authentication method using an embedded gemstone with blockchain technology to provide a method of verifying the authenticity of the good.

2. Discussion of the Prior Art

It is highly desirable for a high-end manufacturer of goods, such as handbags to prevent high quality copies of their handbags to be sold. The high-quality copies dilute the exclusivity of owning a particular prestige brand. Further, if a pre-owned high-end product is being sold, the buyer wants to confirm that they are buying the real product and not a high-quality knock-off.

Accordingly, there is a clearly felt need in the art for goods authentication method using an embedded gemstone with blockchain technology for verifying the authenticity of the good to prevent high-end copies and for the benefit of the secondary sales market.

SUMMARY OF THE INVENTION

The present invention provides a goods authentication method using an embedded gemstone with blockchain technology to provide a method of verifying the authenticity of the good. The goods authentication method using an embedded gemstone with blockchain technology (goods authentication method) preferably includes a setting, a gemstone, a gemstone with an embedded blockchain key and recording the blockchain key on a database. The setting includes bezels. The setting is structured to retain the gemstone and is attached to the good or product with any suitable fastening structure or method. The setting is more difficult to detach from the good or product, than directly attaching the gemstone to the good or product. The fastening structure or method would be dependent upon the material, which the setting is attached to. The setting is preferably fabricated from any suitable material. The setting is fabricated from at least one piece of material. A portion of the gemstone containing the blockchain key would be exposed in the setting. The gemstone is preferably a lab-grown diamond, but other precious or semi-precious gemstones could be used. Using a lab-grown diamond eliminates the need to cut a natural gemstone to fit in a gem cavity in the setting. Forming the blockchain key in the gemstone may be accomplished with laser etching or physical engraving operation. The blockchain key is recorded on a database, which would be accessible by an owner and a potential purchaser of the good.

Accordingly, it is an object of the present invention to provide a goods authentication method for verifying the authenticity of the good to prevent high-end copies and for the benefit of the secondary sales market.

These and additional objects, advantages, features and benefits of the present invention will become apparent from the following specification.

DETAILED DESCRIPTION OF THE PREFERRED EMBODIMENTS

Figure 1:
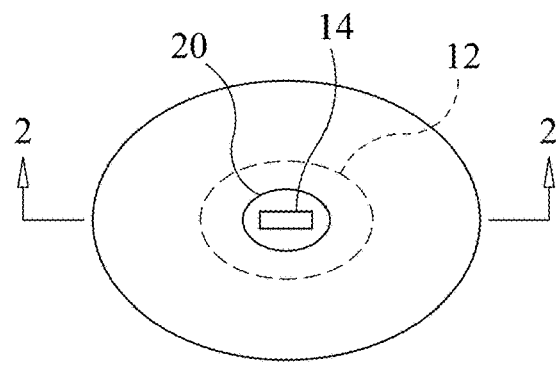
FIG. 1 is a top view of a setting, which contains a gemstone with an embedded blockchain key of a goods authentication method in accordance with the present invention.
Figure 2:
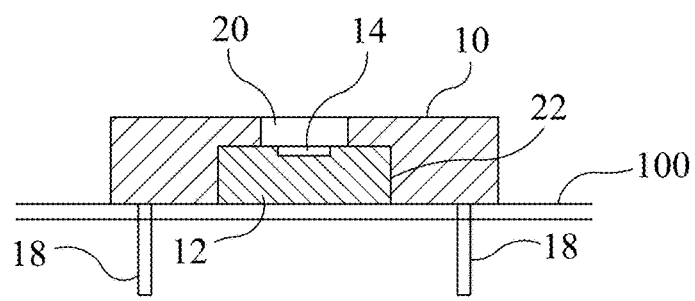
FIG. 2 is a side cross sectional view of a setting with at least two foldable projections, which contains a gemstone with an embedded blockchain key of a goods authentication method in accordance with the present invention.
Figure 3:
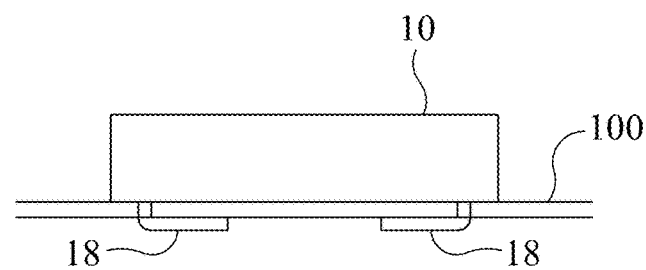
FIG. 3 is a side view of a setting with at least two folded-over projections, which contains a gemstone with an embedded blockchain key of a goods authentication method in accordance with the present invention.
Figure 4:
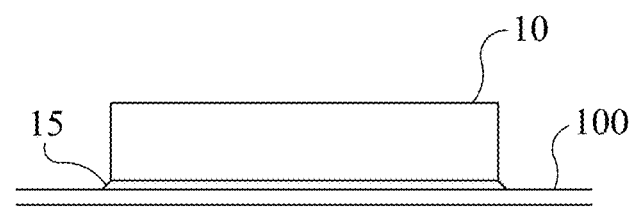
FIG. 4 is a side view of a setting adhered to a good with a bonding substance and which contains a gemstone with an embedded blockchain key of a goods authentication method in accordance with the present invention.

With reference now to the drawings, and particularly to FIG. 1, there is shown a top view of a setting 10 including a gemstone 12 with a blockchain key 14. With reference to FIGS. 2-5, the goods authentication method using an embedded gemstone with blockchain technology (goods authentication method) 1 preferably includes the setting 10, the gemstone 12 with the embedded blockchain key 14; and recording the blockchain key 14 on a database 16. The setting 10 is structured to retain the gemstone 12 and is attached to a good or product 100 with any suitable fastening structure or method, such as at least two foldable projections 18, a bonding substance 15 or both. The fastening structure or method would be dependent upon the material, which the setting 10 is attached to.

The setting 10 is preferably fabricated from a precious metal, a precious metal alloy, a non-precious metal, or a non-metal. The material could be gold, gold alloy, silver, silver alloy, steel, aluminum, brass, titanium, plastic or recycled material. The setting 10 may be manufactured by CNC machining, casting, metal injection molding, 3D printing, plastic molding, or any other suitable manufacturing process. The setting 10 is fabricated from at least one piece of material for retaining the gemstone 12. A portion of the gemstone 12 containing the blockchain key 14 is exposed through a sight opening 20 in the setting 10. The gemstone 12 is preferably a lab-grown diamond, but other types of precious and semi-precious gemstones could also be used. Using a lab-grown diamond eliminates the need to cut a natural gemstone to fit in a gem cavity 22 in the setting 10. Forming the blockchain key 14 in the gemstone 12 may be accomplished with laser etching or a physical engraving operation.

Figure 5:
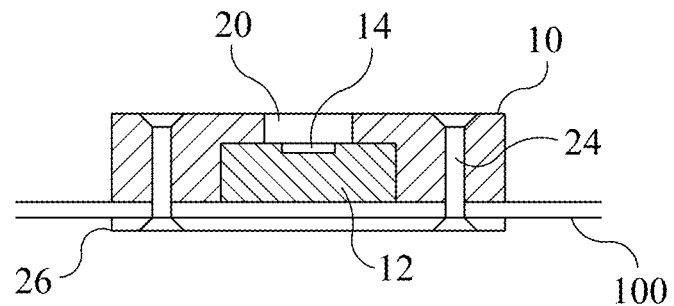
FIG. 5 is a side cross sectional view of a setting with at least two rivets and a backing plate, the setting contains a gemstone with an embedded blockchain key of a goods authentication method in accordance with the present invention.
Figure 6:
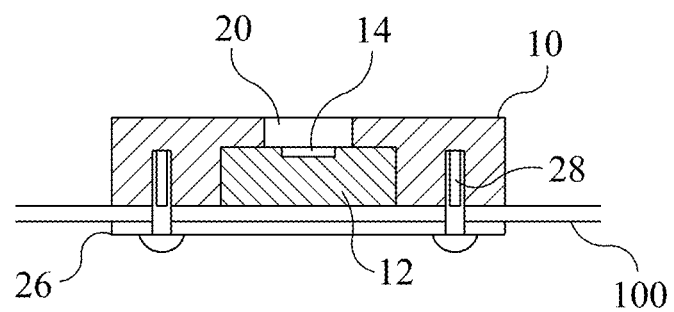
FIG. 6 is a side cross sectional view of a setting with at least two screws and a backing plate, the setting contains a gemstone with an embedded blockchain key of a goods authentication method in accordance with the present invention.
Figure 7:
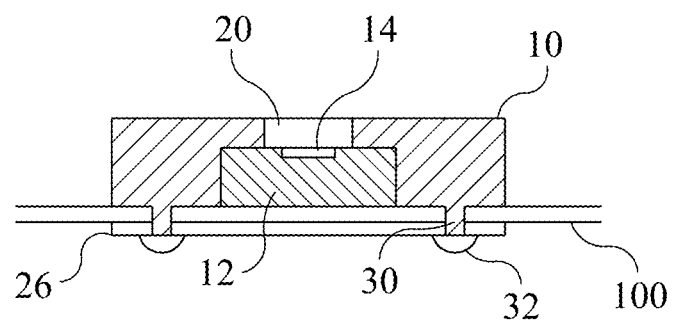
FIG. 7 is a side cross sectional view of a setting with at least two projections and a backing plate, the at least two projections are welded or soldered to the backing plate, the setting contains a gemstone with an embedded blockchain key of a goods authentication method in accordance with the present invention.

With reference to FIG. 5, the setting 10 is preferably secured to the good or product 100 with a pair of rivets 24 and a backing plate 26. However, the backing plate 26 could be eliminated if the head of the rivet is enlarged. With reference to FIG. 6, the setting 10 is preferably secured to the good or product 100 with a pair of screws 28 and the backing plate or at least one washer 26. However, the backing plate or at least one washer 26 could be eliminated if the head of the screw is enlarged. With reference to FIG. 7, the setting 10 is preferably secured to the good or product 100 with soldering or welding. A pair of projections 30 extend from a bottom of the setting 10. The pair of projections 30 extend through a hole is the backing plate 26 and are welded or soldered 32 to the backing plate 26. The pair of projections 30 are welded or soldered to the backing plate 26.

Figure 8:
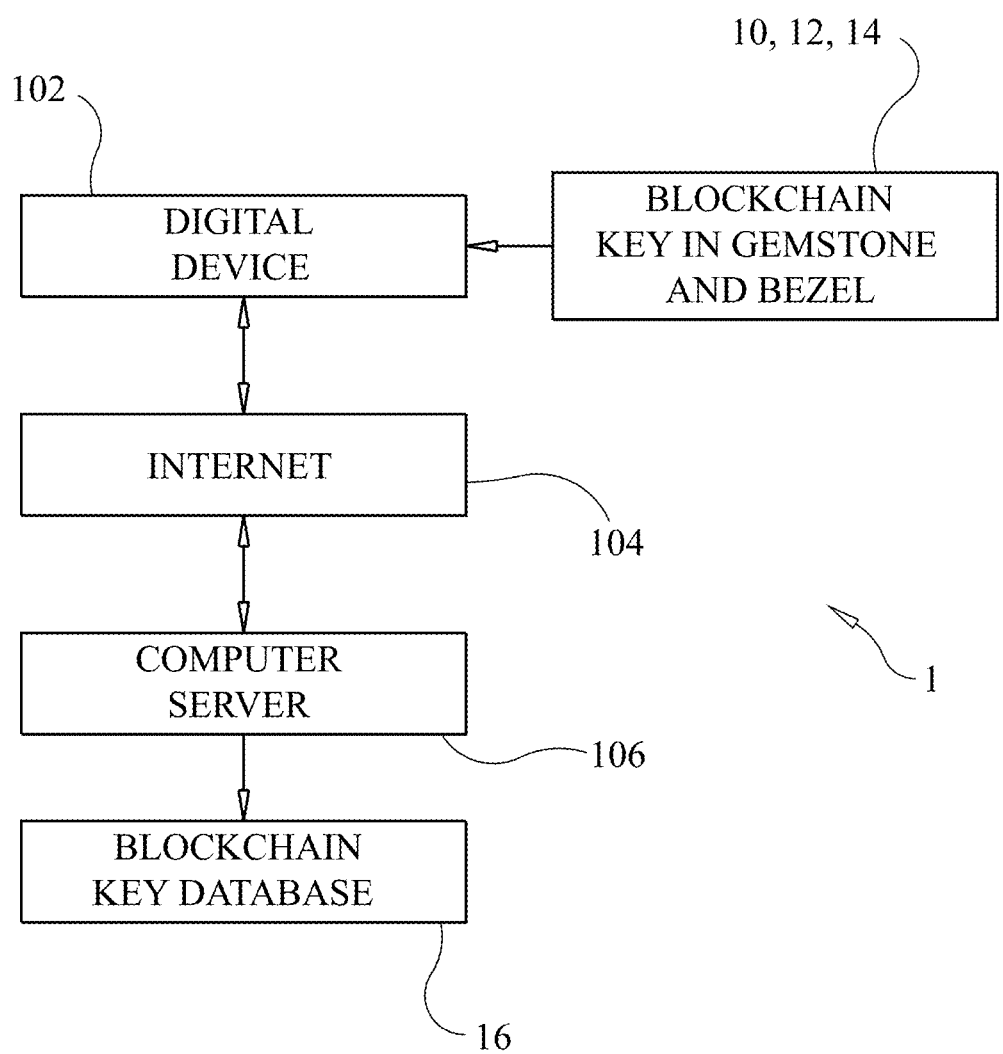
FIG. 8 is a flow chart illustrating a blockchain key contained on a database and the database accessed by a computer server, which is accessed by a user through the internet of a goods authentication method in accordance with the present invention.

With reference to FIG. 8, the blockchain key 14 is recorded on the blockchain database 16. A user obtains the blockchain key 14 from the gemstone 12. The user then accesses the block chain database 16 through a digital device 102, such as a computer or a smart phone. The user goes on the internet 104 to find a blockchain website or though some other type of online portal. The block chain database 16 could be provided by the source of the blockchain key 14 or from a third party source. The user enters the blockchain key 14 with other information concerning the good or product 100 into a blockchain computer server 106 to access the blockchain database 16. The computer server 106 will confirm if the blockchain key 14 is associated with the other entered information.

While particular embodiments of the invention have been shown and described, it will be obvious to those skilled in the art that
changes and modifications may be made without departing from the invention in its broader aspects, and therefore, the aim in the appended claims is to cover all such changes and modifications as fall within the true spirit and scope of the invention.

The invention claimed is:

1. A method of goods authentication using an embedded gemstone with blockchain technology, comprising the steps of:
   providing a gemstone;
   providing a setting having a top surface and a bottom surface, a gem cavity is formed in said bottom surface, a sight opening is formed in said top surface, said gem cavity is accessed from said bottom surface of said setting, said gemstone is inserted into said gem cavity from said bottom surface of said setting;
   forming a blockchain key on a top surface of said gemstone;
   retaining said gemstone in said gem cavity, said blockchain key on said gemstone is viewable through said sight opening, a bottom surface of said gemstone and said setting are in contact with a good or a product; and
   recording said blockchain key in a blockchain database.

2. The method of goods authentication of claim 1, wherein:
   said setting is fabricated from a precious metal, a precious metal alloy, a non-precious metal, or a non-metal.

3. The method of goods authentication of claim 1, wherein:
   said gemstone is precious or semi-precious.

4. The method of goods authentication of claim 1, wherein:
   said gemstone is a lab grown diamond.

5. The method of goods authentication of claim 1, wherein:
   said setting is mechanically secured to the good or product with at least one of foldable projections, screws, rivets, welding or soldering.

6. The method of goods authentication of claim 1, wherein:
   said setting is secured to the good or product with a bonding substance.

7. A method of goods authentication using an embedded gemstone with blockchain technology, comprising the steps of:
   providing a gemstone;
   providing a setting having a top surface and a bottom surface, a gem cavity is formed in said bottom surface, a sight opening is formed in said top surface, said gem cavity is accessed from said bottom surface of said setting, said gemstone is inserted into said gem cavity from said bottom surface of said setting;
   forming a blockchain key on a top surface of said gemstone;
   retaining said gemstone in said gem cavity, said blockchain key on said gemstone is viewable through said sight opening, a bottom surface of said gemstone and said setting are in contact with a good or a product; and
   recording said blockchain key in a blockchain database;
   providing access to said blockchain database through an online portal.

8. The method of goods authentication of claim 7, wherein:
   said setting is fabricated from a precious metal, a precious metal alloy, a non-precious metal, or a non-metal.

9. The method of goods authentication of claim 7, wherein:
   said gemstone is precious or semi-precious.

10. The method of goods authentication of claim 7, wherein:
    said gemstone is a lab grown diamond.

11. The method of goods authentication of claim 7, wherein:
    said setting is mechanically secured to the good or product with at least one of foldable projections, screws, rivets, welding or soldering.

12. The method of goods authentication of claim 7, wherein:
    said setting is secured to the good or product with a bonding substance.

13. A method of goods authentication using an embedded gemstone with blockchain technology, comprising the steps of:
    providing a gemstone;
    providing a setting having a top surface and a bottom surface, a gem cavity is formed in said bottom surface, a depth of said gem cavity is at least as much as a height of said gemstone, a sight opening is formed in said top surface, said gem cavity is downward facing and accessed from said bottom surface of said setting, said gemstone is inserted into said gem cavity from said bottom surface of said setting;

forming a blockchain key on a top surface of said gemstone;

retaining said gemstone in said gem cavity, said blockchain key on said gemstone is viewable through said sight opening, a bottom surface of said gemstone and said setting are in contact with a good or product; and recording said blockchain key in a blockchain database.

14. The method of goods authentication of claim 13, wherein:

said setting is fabricated from a precious metal, a precious metal alloy, a non-precious metal, or a non-metal.

15. The method of goods authentication of claim 13, wherein:

said gemstone is precious or semi-precious.

16. The method of goods authentication of claim 13, wherein:

said gemstone is a lab grown diamond.

17. The method of goods authentication of claim 13, wherein:

said setting is mechanically secured to the good or product with at least one of foldable projections, screws, rivets, welding or soldering.

* * * * *